(12) United States Patent
Fujisawa et al.

(10) Patent No.: US 6,175,785 B1
(45) Date of Patent: Jan. 16, 2001

(54) HYBRID VEHICLE

(75) Inventors: Yutaka Fujisawa, Tokyo; Satoshi Sakakibara, Yamato, both of (JP)

(73) Assignee: Nissan Motor Co., Ltd., Yokohama (JP)

(*) Notice: Under 35 U.S.C. 154(b), the term of this patent shall be extended for 0 days.

(21) Appl. No.: 09/333,027

(22) Filed: Jun. 15, 1999

(30) Foreign Application Priority Data

Jun. 15, 1998 (JP) .................................................. 10-166881

(51) Int. Cl.[7] .............................. B60L 11/00; G05D 7/00
(52) U.S. Cl. ........................ 701/22; 701/51; 701/54; 192/103 R; 477/2; 477/5; 477/166
(58) Field of Search ................................. 701/22, 29, 51, 701/54; 477/2, 3, 5, 6, 7, 8, 166, 173, 181; 192/103 R

(56) References Cited

U.S. PATENT DOCUMENTS 5,697,466 * 12/1997 Moroto et al. ..................... 180/65.2
5,722,502 * 3/1998 Kubo .................................. 180/65.4
5,928,301 * 7/1999 Soga et al. ............................. 701/51
6,090,007 * 7/2000 Nakajima et al. ..................... 477/46

FOREIGN PATENT DOCUMENTS 9-286245   11/1997  (JP) .

* cited by examiner

Primary Examiner—William A. Cuchlinski, Jr.
Assistant Examiner—Olga Hernandez
(74) Attorney, Agent, or Firm—Foley & Lardner

(57) ABSTRACT

A hybrid vehicle is driven by either an engine or a motor by tightening or releasing a clutch interposed between an engine and a transmission. A generator is connected to the engine, and the engine torque is absorbed by the generator when the power source is changed over from the motor to the engine. The clutch is tightened when the engine rotation speed of the motor and the engine coincide. As a result, the torque input to the transmission is maintained constant, and a shock due to change-over of the power source is suppressed.

6 Claims, 4 Drawing Sheets

6: CRANK ANGLE SENSOR
7: ROTARY ENCODER
8: ACCELERATOR PEDAL DEPRESSION SENSOR
9: VEHICLE SPEED SENSOR

HYBRID VEHICLE

FIELD OF THE INVENTION

This invention relates to a hybrid vehicle equipped with an engine and a motor as a power source, and which is driven by the engine and/or motor.

BACKGROUND OF THE INVENTION

A hybrid vehicle fitted with a motor and an engine connected in series via a clutch is disclosed in Tokkai Hei 9-286245 published by the Japanese Patent Office in 1997. In this vehicle, at low engine rotation speed when the engine efficiency is low and the vehicle is starting under low load, the clutch is released and the vehicle is driven only by the motor. When the vehicle speed has risen to some extent, the clutch is engaged and the power source is changed over from the motor to the engine.

SUMMARY OF THE INVENTION

However, if the torque and rotation speed of the motor and those of the engine before the engagement of the clutch do not coincide, a shock will occur when the clutch is engaged.

It is therefore an object of this invention to eliminate the shock occurring when the power source in a hybrid vehicle is changed over.

In order to achieve the above object, this invention provides a hybrid vehicle comprising an engine and motor, and driven by selectively applying the engine or the motor as a power source, comprising a transmission connected to the motor, a clutch interposed between the engine and the motor, a generator connected to the engine, a sensor for detecting a rotation speed of the engine, a sensor for detecting a rotation speed of the motor. The hybrid vehicle further comprises a microprocessor which is programmed to control a torque of the engine to achieve a predetermined target torque, primarily control a power generation amount of the generator so that the power generation amount of the generator is equal to the torque of the engine, secondarily control a power generation amount of the generator so that the rotation speed of the engine coincides with the rotation speed of the motor, and tighten the clutch when the rotation speeds of the motor and the engine coincide.

The details as well as other features and advantages of this invention are set forth in the remainder of the specification and are shown in the accompanying drawings.

DESCRIPTION OF THE PREFERRED EMBODIMENTS

Figure 1:
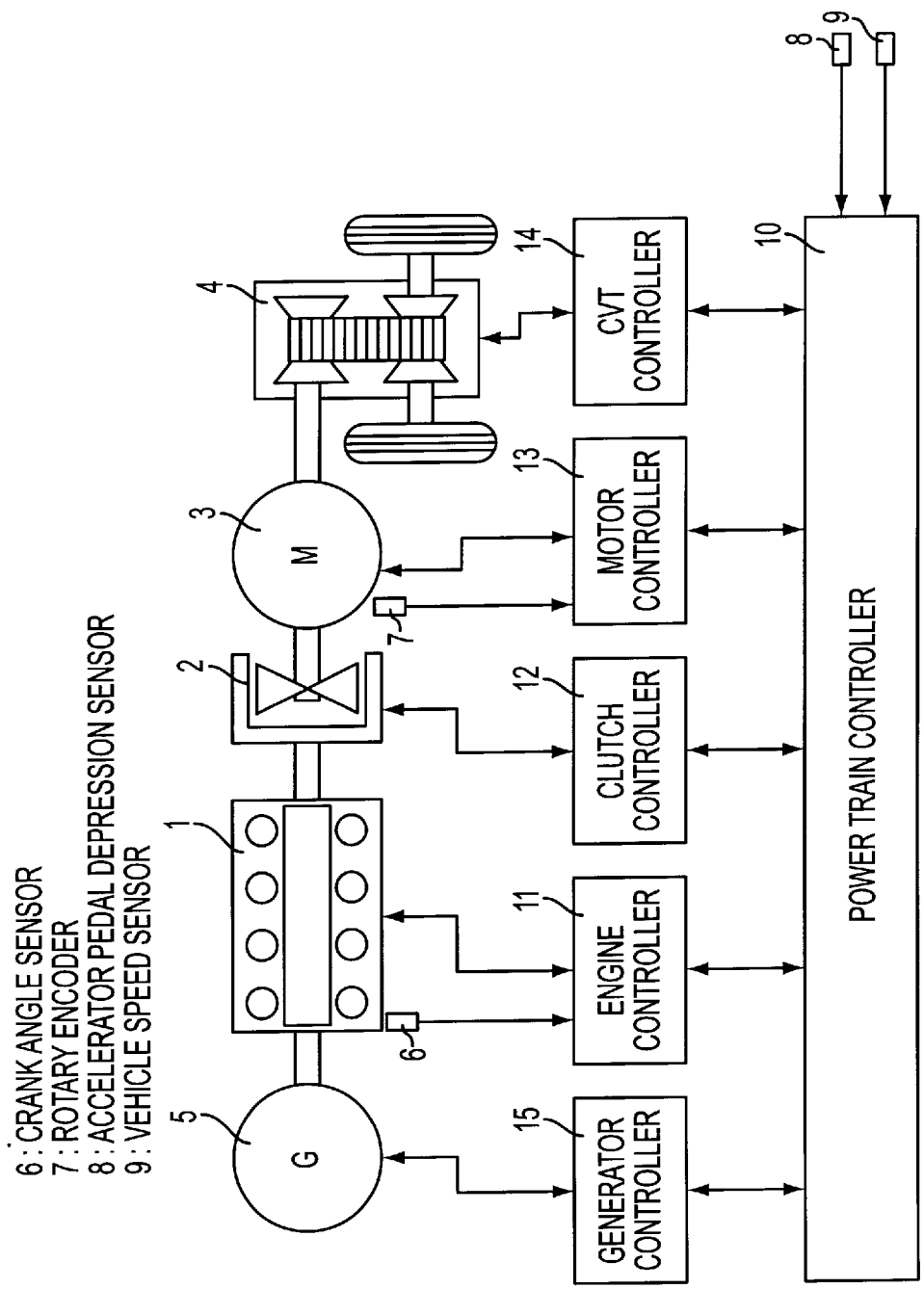
FIG. 1 is a schematic diagram of a hybrid vehicle and a controller according to this invention.

Referring to FIG. 1 of the drawings, a hybrid vehicle is equipped with an engine 1, clutch 2, motor 3, continuously variable transmission (CVT) 4, and a final reduction gear unit, not shown.

The output shaft of the engine 1 is connected to the input shaft of the clutch 2. A common output shaft of the clutch 2 and motor 3 is connected to the input shaft of the CVT 4. The motor 3 is interposed between the clutch 2 and CVT 4. The motor 3 may also be connected on the other side of the CVT 4 from the clutch. The engine rotation speed of the engine 1 is detected by a crank-angle sensor 6. The rotation speed of the motor 3 is detected by a rotary encoder 7.

The clutch 2 can adjust the torque transmitted from an input shaft to an output shaft. The clutch 2 may for example be an electromagnetic powder clutch which can regulate the transmitted torque according to the intensity of an exciting current passed in an electromagnetic coil.

When the clutch 2 is engaged, the engine 1 and motor 3 drive the vehicle. When the clutch 2 is released, only the motor 3 drives the vehicle. In general, the clutch 2 is released when the vehicle is starting or running at a very low speed, where the efficiency of the engine 1 is low, and the vehicle is driven only by the motor 3. At this time, the motor 3 is controlled to give a target engine rotation speed and target torque computed according to an accelerator pedal operation amount and the vehicle speed.

If the vehicle speed increases to some extent, the clutch 2 is engaged, the power source is changed over from the motor 3 to the engine 1, and the vehicle is driven by the engine 1. When a large drive force is required as when the vehicle is accelerating from rest with the throttle fully open, the clutch 2 is engaged and the vehicle is driven by both the engine 1 and motor 3.

A generator 5 is connected on the opposite side of the output shaft of the engine 1. The generator 5, when the engine 1 is running, generates electric power. The generator 5 is driven also by electric power from a battery, not shown, and is used as a starter motor when starting the engine 1.

The CVT 4 is a belt CVT which can vary a speed ratio continuously. The CVT 4 may be a toroidal CVT or a conventional transmission using planetary gears.

The engine 1, clutch 2, motor 3, CVT 4 and generator 5 are controlled by an engine controller 11, clutch controller 12, motor controller 13, CVT controller 14, and a generator controller 15, respectively. General control of the controllers 11–15 is performed by a power train controller 10.

Signals from an accelerator pedal depression sensor 8 and vehicle speed sensor 9, and the running state of the engine 1, clutch 2, motor 3, CVT 4 and generator 5 are input into the power train controller 10.

Based on these signals, the power train controller 10 computes a target engine rotation speed and target torque of the engine 1, a target tightening torque of the clutch 2, a target engine rotation speed and target torque of the motor 3, and a target power generation amount of the generator 5, and outputs these to the controllers 11–15.

Figure 2:
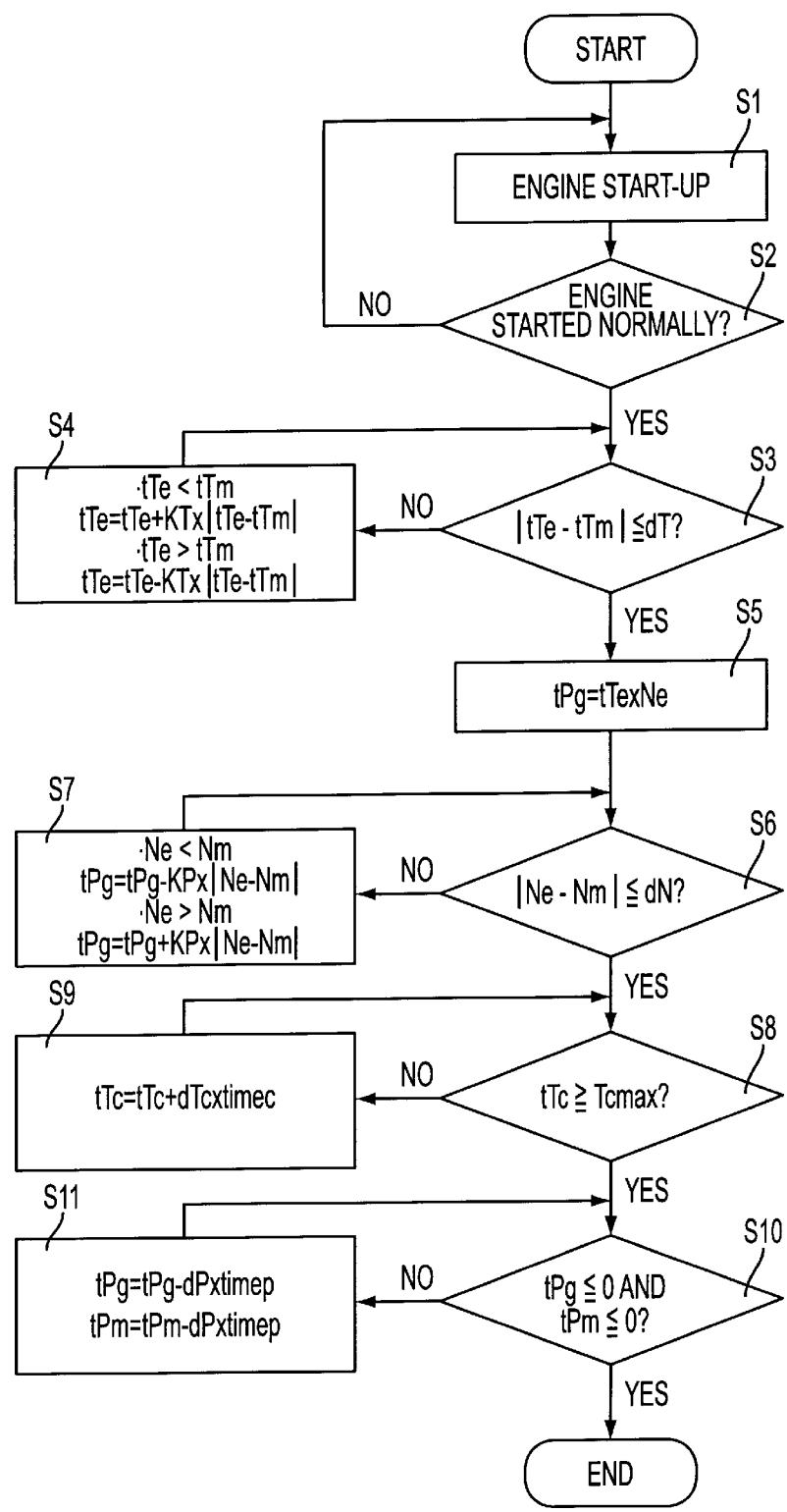
FIG. 2 is a flowchart for describing a power source change-over process performed by the controller.
Figure 3A:
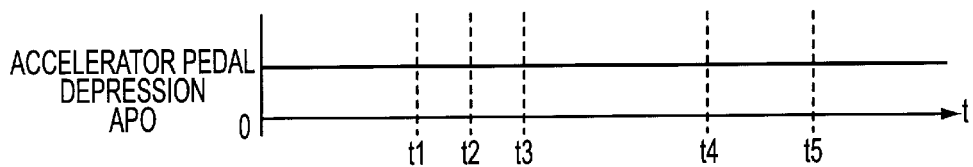
FIG. 3A–FIG. 3K are timing charts which describe the situation when the power source is changed over by the controller.
Figure 3B:
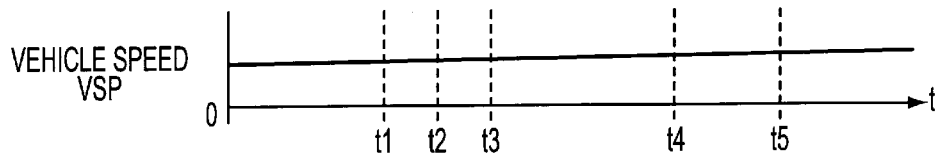
Figure 3C:
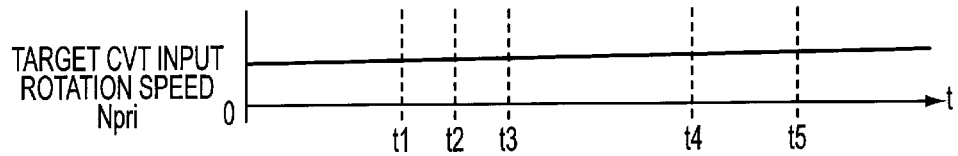
Figure 3D:
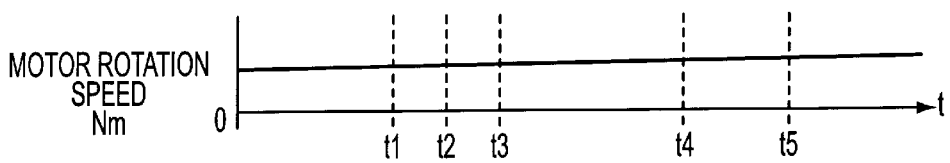
Figure 3E:
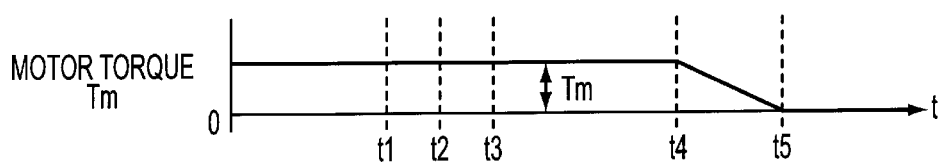
Figure 3F:
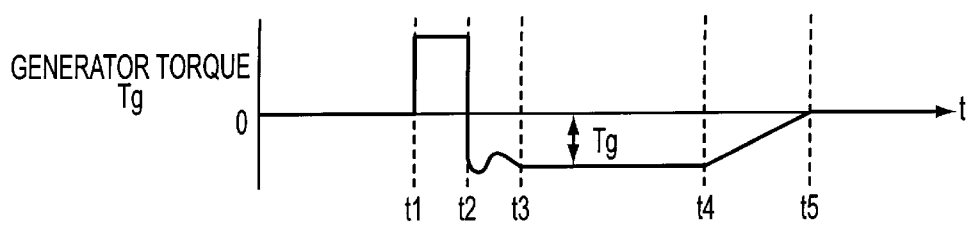
Figure 3G:
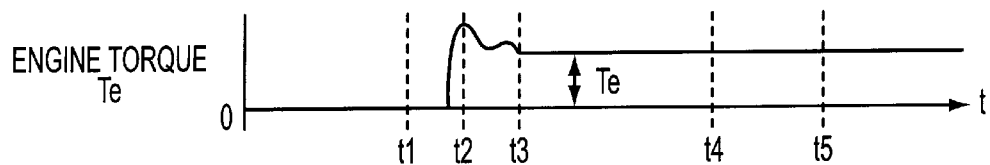
Figure 3H:
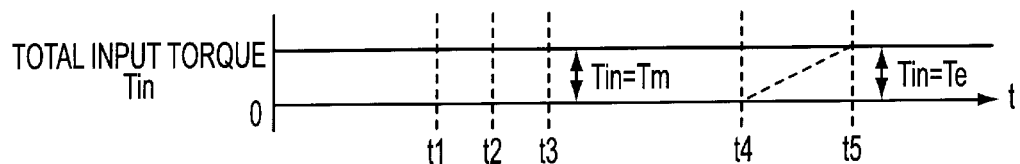
Figure 3I:
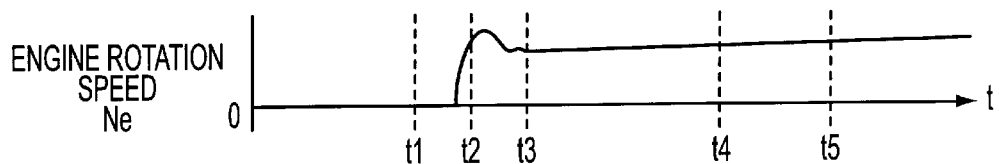
Figure 3J:
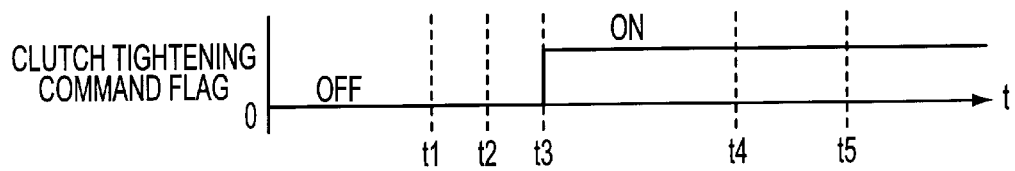
Figure 3K:
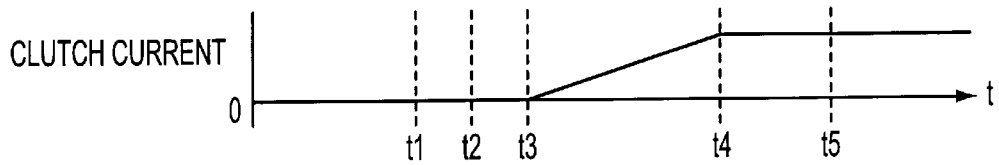

FIG. 2 is a flowchart showing the contents of a power source change-over control process which the power train controller 10 performs. This process is performed when the power source is changed over from the motor 3 to the engine 1 when the clutch 2 is fully released and the vehicle is traveling only under the motor 3.

First, in a step S1, the engine 1 is started using the generator 5 as a starting motor. At this time, the clutch 3 is released and the torque of the engine 1 is not input into the CVT 4. The step S1 is repeated until it is determined that the engine 1 has started normally in a step S2, and the routine proceeds to a step S3.

Next, in the steps S3 and S4, a target torque tTm of the engine 1 is computed so that a torque Te of the engine 1 is equal to the torque Tm of the motor 3. The torque of the engine 1 is controlled by controlling an opening of the electronically controlled throttle independently of the accelerator pedal so that it is equal to a target opening $t\Theta$ computed from the current engine rotation speed Ne and target engine torque tTe, and by controlling a fuel injection amount and ignition timing.

In the step S3, the target engine torque tTe and target motor torque tTm are compared. If the difference of the target engine torque tTe and the target motor torque tTm is larger than a predetermined value dT, the routine proceeds to a step S4, and if the difference is smaller than the predetermined value dT, the routine proceeds to a step S5. The predetermined value dT is determined here according to a control variation and a dead zone.

In the step S4, the target engine torque tTe is corrected. When the target engine torque tTe is smaller than the target motor torque tTm, a new target engine torque tTe is obtained by adding to the present target engine torque tTe, a value obtained by multiplying the difference between the target engine torque tTe and the target motor torque tTm by a feedback coefficient KT.

$$tTe=tTe+KT\times|tTe-tTm|$$

When it is larger than the target motor torque tTm, the new target engine torque tTe is obtained by subtracting from the present target engine torque tTe, the value obtained by multiplying the difference between the target engine torque tTe and the target motor torque tTm by the feedback coefficient KT.

$$tTe=tTe-KT\times|tTe-tTm|$$

After the target engine torque Te is corrected in the step S4, the routine returns to the step S3, and processing from the step S3 to the step S4 is repeated until the difference of the target engine torque tTe and target motor torque tTm becomes smaller than the predetermined value dT.

When the difference of the target engine torque tTe and the target motor torque tTm becomes smaller than the predetermined value dT, the routine proceeds to a step S5. If the engine 1 has no load at this time, the engine rotation speed increases excessively. In the step S5, therefore, the torque generated by the engine is absorbed and excessive increase of the engine rotation speed is prevented by making the generator 5 connected to the engine 1 generate electricity. Here, a target power generation amount tPg of the generator 5 is set so that the power generation torque of the generator 5 is equal to the target engine torque tTe.

$$tPg=tTe\times Ne$$

Further, in steps S6 and S7, the target power generation amount tPg of the generator 5 is corrected and engine rotation speed control of the engine 1 is performed so that the engine rotation speed Nm of the motor 3 and the engine rotation speed Ne of the engine 1 are equal.

In the step S6, the engine rotation speed Ne and the motor rotation speed Nm are compared. If the difference of the engine rotation speed Ne and the motor rotation speed Nm is larger than a predetermined value dN, the routine proceeds to the step S7, and if the difference is smaller than the predetermined value dT, the routine proceeds to a step S8. The predetermined value dN is determined here according to a control variation and a dead zone.

In the step S7, the target power generation amount tPg of the generator 5 is corrected. When the engine rotation speed Ne is smaller than the motor rotation speed Nm, a new target power generation amount tPg is obtained by subtracting from the present target power generation amount tPg, a value obtained by multiplying the difference between the engine rotation speed Ne and the motor rotation speed Nm by a feedback coefficient KP.

$$tPg=tPg-KP\times|Ne-Nm|$$

When the engine rotation speed Ne is larger than the motor rotation speed Nm, the new target power generation amount tPg is obtained by adding to the present target power generation amount tPg, a value obtained by multiplying the difference between the engine rotation speed Ne and the target motor torque tTm by the feedback coefficient KP.

$$tPg=tPg+KP\times|Ne-Nm|$$

Herein, the coefficient KP is a coefficient which converts the engine rotation speed which is synchronized with the generator rotation speed into the power generation amount.

After the target power generation amount tPg is corrected, the routine returns to the step S6, and processing from the step S6 to the step S7 is repeated until the difference of the engine rotation speed Ne and the motor rotation speed Nm becomes smaller than a predetermined value dN.

When the difference of rotation speeds becomes less than the predetermined value dN, the routine proceeds to a step S8 and tightening of the clutch 2 is performed. At this time, the rotation speeds of the engine 1 and the motor 3 almost coincide, the torque Te generated by the engine 1 is absorbed by the generator 5, and is not input to the input shaft of the clutch 2.

In a step S9, a target tightening torque tTc is increased by a certain proportion dTc in proportion to an elapsed time timec from when the clutch 2 started to be tightened.

$$tTc=tTc+dTc\times timec$$

The step S8 and step S9 are repeated until the target tightening torque tTc of the clutch 2 becomes larger than a maximum tightening torque Tcmax. When the target tightening torque tTc is larger than the maximum tightening torque Tcmax, the routine proceeds to a step S10.

In the step S10, it is determined whether or not a motor power consumption tPm is zero, and whether or not a power tPg generated by the generator 5 is zero. If the power consumption tPm of the motor 2 is not zero, or the power tPg generated by the generator 5 is not zero, the routine proceeds to a step S11.

In the step S11, the power consumption tPm of the motor 2 and the power tPg generated by the generator 5 are decreased by a fixed proportion dP which is proportional to an elapsed time timep from when a change-over was begun, and the routine returns to the step S10.

$$tPg=tPg-dP\times timep$$

$$tPm=tPm-dP\times timep$$

The torque Tm of the motor 3 decreases in proportion to a decrease amount of the motor power consumption tPm, and the engine torque Te which is transmitted to the input shaft of the CVT 4 via the clutch 2 increases in proportion to the decrease amount of the power tPg generated by the generator 5.

As the decrease amount of the motor power consumption tPm is equal to the decrease of the generator power generation amount tPg, the decrease amount of the motor torque Tm is equal to the increase amount of the engine torque Te. Consequently, a sum Tin of the motor torque Tm and engine torque Te which is input to the CVT 4 is maintained constant.

By repeating the step S10 and a step S11, the motor power consumption tPm and the generator power generation amount tPg decrease in the fixed proportion dP, and the motor torque Tm and the generator power generation amount tpg become zero.

As a result, only the engine torque Tm is input to the CVT 4, and the motive power change-over from the motor 3 to the engine 1 is complete.

The timing charts shown in FIG. 3A–FIG. 3K show the torque and rotation speed of each component when the power source is changed over from the motor 3 to the engine 1.

During startup, the vehicle is driven only by the motor 3. When the vehicle speed VSP increases to some extent, at a time t1, a power source change-over from the motor 3 to the engine 1 is determined. This determination is made based on an accelerator pedal depression APO and the vehicle speed VSP.

At a time t2, the engine 1 starts, and the torque of the engine 1 is controlled so that the torque Te of the engine 1 is equal to the torque Tm of the motor 3. Further, by adjusting the power generation amount of the generator 5, the engine rotation speed of the engine 1 is controlled so that the engine rotation speed Ne becomes equal to the motor rotation speed Nm. At this time, the torque Tm of the engine 1 is used by the generator 5 to generate electric power, and is stored in a battery.

At a time t3, the torque Te and the engine rotation speed Ne of the engine 1 become equal to the torque Tm and the rotation speed Nm of the motor 3, and a tightening command flag ON of the clutch 2 is output. When this tightening command flag is ON, a clutch current increases in a fixed proportion until the tightening force of the clutch 2 reaches a maximum, and the tightening force of the clutch 2 increases. At this time, the engine rotation speed Ne and the motor engine rotation speed Nm are almost equal, and as the torque Te of the engine 1 is absorbed by the generator 5, the torque input to the CVT 4 does not fluctuate.

At a time t4, the tightening force of the clutch 2 reaches a maximum, and then the motor torque Tm and the generator torque Tg decrease in a fixed proportion until they become zero. The generator torque Tg is the torque of the engine 1 absorbed due to generation of electricity by the generator 5. As the decrease of the motor torque Tm and the decrease of the generator torque Tg are then equal, the torque Tin input to the CVT 4 is maintained constant.

At a time t5, both the motor torque Tm and the generator torque Tg are zero. Only the engine torque Te is input to the CVT 4, and the power source change-over is complete.

Hence, when the power source is changed over according to this invention, rotation speed synchronous control is performed using engine torque control and the generator, and the power source can be changed over without a shock occurring when the clutch is tightened.

The entire contents of Japanese Patent Application P10-166881 (filed Jun. 15, 1998) are incorporated herein by reference.

Although the invention has been described above by reference to certain embodiments of the invention, the invention is not limited to the embodiments described above. Modifications and variations of the embodiments described above will occur to those skilled in the art, in light of the above teachings.

The scope of the invention is defined with reference to the following claims.

What is claimed:

1. A hybrid vehicle comprising an engine and motor, and driven by selectively applying said engine or said motor as a power source, comprising:

a transmission connected to said motor, a clutch interposed between said engine and said motor, a generator connected to said engine, means for detecting a rotation speed of said engine, means for detecting a rotation speed of said motor, means for controlling a torque of said engine to achieve a predetermined target torque, means for primarily controlling a power generation amount of said generator so that the power generation amount of said generator is equal to the torque of said engine, means for secondarily controlling a power generation amount of said generator so that the rotation speed of said engine coincides with the rotation speed of said motor, and means for tightening said clutch when the rotation speeds of said motor and said engine coincide.

2. A hybrid vehicle comprising an engine and motor, and driven by selectively applying said engine or said motor as a power source, comprising:

a transmission connected to said motor, a clutch interposed between said engine and said motor, a generator connected to said engine, a sensor for detecting a rotation speed of said engine, a sensor for detecting a rotation speed of said motor, and a microprocessor programmed to:

control a torque of said engine to achieve a predetermined target torque, primarily control a power generation amount of said generator so that the power generation amount of said generator is equal to the torque of said engine secondarily control a power generation amount of said generator so that the rotation speed of said engine coincides with the rotation speed of said motor, and tighten said clutch when the rotation speeds of said motor and said engine coincide.

3. A hybrid vehicle comprising an engine and motor, and driven by selectively applying said engine or said motor as a power source, comprising:

a transmission connected to said motor, a clutch interposed between said engine and said motor, a generator connected to said engine, a sensor for detecting a rotation speed of said engine, a sensor for detecting a rotation speed of said motor, and a microprocessor programmed to:

control a torque of said engine to achieve a predetermined target torque, control the torque of said engine so that the torque of said engine is equal to the torque of said motor, primarily control a power generation amount of said generator so that the power generation amount of said generator is equal to the torque of said engine, secondarily control a power generation amount of said generator so that the rotation speed of said engine coincides with the rotation speed of said motor, and tighten said clutch when the rotation speeds of said motor and said engine coincide.

4. A hybrid vehicle as defined in claim 3, wherein:

said microprocessor is further programmed to increase a tightening force in a fixed proportion when said clutch is tightened.

5. A hybrid vehicle as defined in claim 3, wherein:

said microprocessor is further programmed to decrease said engine torque absorbed by said generator and said motor torque until said torques become zero after said clutch is tightened.

6. A hybrid vehicle as defined in claim 5, wherein:

said microprocessor is further programmed to decrease said engine torque absorbed by said generator and said motor torque in the same proportion.

* * * * *